US008228572B2

(12) United States Patent
Ikeda

(10) Patent No.: US 8,228,572 B2

(45) Date of Patent: Jul. 24, 2012

(54) IMAGE FORMING APPARATUS, IMAGE FORMING SYSTEM, AND IMAGE PROCESSING METHOD

(75) Inventor: Atsushi Ikeda, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 560 days.

(21) Appl. No.: 12/479,294

(22) Filed: Jun. 5, 2009

(65) Prior Publication Data

US 2009/0316232 A1 Dec. 24, 2009

(30) Foreign Application Priority Data

Jun. 24, 2008 (JP) ................................ 2008-165079

(51) Int. Cl.
*H04N 1/04* (2006.01)
*G06F 3/12* (2006.01)
*G02B 26/08* (2006.01)

(52) U.S. Cl. ..................... 358/498; 358/1.15; 359/204.1

(58) Field of Classification Search ................. 358/1.15, 358/498; 359/204.1

See application file for complete search history.

(56) References Cited

U.S. PATENT DOCUMENTS

| | | | | |
|---|---|---|---|---|
| 6,342,963 | B1 * | 1/2002 | Yoshino | 359/204.1 |
| 7,002,701 | B1 | 2/2006 | Nakayasu et al. | 358/1.12 |
| 2008/0259397 | A1 * | 10/2008 | Uehara | 358/1.15 |

FOREIGN PATENT DOCUMENTS

| | | |
|---|---|---|
| JP | 3388193 | 1/2003 |

* cited by examiner

*Primary Examiner* — Charlotte M Baker
*Assistant Examiner* — Rury Grisham
(74) *Attorney, Agent, or Firm* — Fitzpatrick, Cella, Harper & Scinto

(57) ABSTRACT

A correction of a deviation in the sub-scanning direction of a scan line accompanied by a correction of a main scan positional deviation of each sheet feeding port is insufficient. According to the present technique, therefore, the positional deviation in the sub-scanning direction of an image to be printed is corrected by using a correction amount regarding the main scan positional deviation which is decided based on an adjustment value of a print position of the sheet feeding port and information of the positional deviation in the sub-scanning direction of an image forming apparatus.

15 Claims, 11 Drawing Sheets

IMAGE FORMING APPARATUS, IMAGE FORMING SYSTEM, AND IMAGE PROCESSING METHOD

BACKGROUND OF THE INVENTION

1. Field of the Invention

The present invention relates to an image forming apparatus for digitally correcting a distortion of an image accompanied by a curve or an inclination of a laser beam and to a control method for the image forming apparatus.

2. Description of the Related Art

In an image forming apparatus of an electrophotographic system, a method whereby a step of adjusting a laser scanner is reduced and a distortion of an image accompanied by a curve of a laser beam is digitally corrected to thereby reduce the costs has been disclosed in Japanese Patent No. 3388193.

For example, in a digital correction in a sub-scanning direction of a scan line, a line is properly changed based on a shift amount of the laser beam which has previously been obtained so that the shift amount can be set off, and the image is formed. The "line" mentioned here denotes a set of pixels arranged in a main scanning direction.

When describing in more detail, for example, when the shift amount of the laser beam from a position x in the main scanning direction is expressed by f(x), a number −y which is obtained from a value y obtained by rounding off f(x) is assumed to be a scan line changing amount. All data within an interval from $x_i$ to $x_j$ where the scan line changing amounts are equal is shifted by a distance corresponding to −y lines. By applying such a process to all image regions, the curve of the laser beam is set off and an original image can be reproduced.

Different from the above case, there is a case where a reference position of a sheet is deviated in the main scanning direction from an ideal position due to a tolerance or the like of a sheet conveying mechanism. In many cases, a deviation amount differs depending on a sheet feeding port.

A method of moving a writing position of an image based on a deviation amount of each sheet feeding port in order to correct those deviations has been known. With respect to the deviation amount of each sheet feeding port, there is an apparatus constructed in such a manner that it has been preset into a nonvolatile memory of the apparatus upon shipping from a factory, an apparatus constructed in such a manner that a user interface is provided and the user can properly change a set value as a correction amount, or the like.

However, in the related art, the following problem occurs in the case of simultaneously performing both of the digital correction in the sub-scanning direction of the scan line in the former case and the correction of the main scan positional deviation of each sheet feeding port in the latter case.

According to a correction amount s at which the writing position of the image has been moved in order to make the latter correction, the scan line changing amount in the former correction is calculated and a scan line changing amount can be calculated based on f(x+s) in place of f(x).

By calculating the scan line changing amount based on f(x+s), even if the writing position of the image is moved according to the deviation amount at the sheet feeding port, a color drift in the sub-scanning direction accompanied by the curve of the laser beam can be eliminated.

However, in the case of an image forming apparatus of what is called a host base in which a rendering of print image and the digital correction in the sub-scanning direction of the scan line are not executed in the image forming apparatus but are executed by a printer driver, there are the following problems.

That is, there is a case where the sheet feeding port cannot be specified at timing when the printer driver forms a print job. An apparatus in which even if the specific sheet feeding port is not designated, the sheet feeding port is automatically selected according to a sheet size or sheet type of the print job, or the like corresponds to such a case. In such an apparatus, when an absence of sheets has occurred at the sheet feeding port which was selected first, the sheet feeding port is switched to another sheet feeding port in which the sheets of the same sheet size and sheet type have been enclosed and the print is continued.

With respect to the correction of the main scan positional deviation of each sheet feeding port, a correction amount of the sheet feeding port which was selected first is assumed to be s1, a correction amount of the sheet feeding port which was selected second is assumed to be s2, and s1≠s2.

As described in the related art, it is demanded to calculate the scan line changing amount based on f(x+s) in place of f(x) according to the correction amount s of the writing position of the image.

It is now assumed that when the printer driver forms the print job, only the sheet feeding port which is selected first could be specified and the scan line changing amount was calculated based on f(x+s1). In this case, naturally, a print result to a sheet conveyed from the sheet feeding port which is selected first is good. However, if there are no sheets in the first sheet feeding port and the print is executed to a sheet conveyed from the sheet feeding port which was selected second, the scan line is deviated in the sub-scanning direction by a distance corresponding to f(x+s2)−f(x+s1).

SUMMARY OF THE INVENTION

It is an object of the invention to provide an image forming apparatus, an image forming system, and an image processing method, in which a deviation in a sub-scanning direction of a scan line accompanied by a correction of a main scan positional deviation of each sheet feeding port can be reduced.

It is another object of the invention to provide an image forming apparatus, an image forming system, and an image processing method, in which when a sheet feeding port can be specified, a deviation in a sub-scanning direction of a scan line accompanied by a correction of a main scan positional deviation of each sheet feeding port can be reduced.

The invention is made in consideration of the foregoing problems and the positional deviation in the sub-scanning direction of an image which is printed is corrected by using a correction amount regarding the main scan positional deviation which is decided based on a print position of each sheet feeding port and information of the positional deviation in the sub-scanning direction of the image forming apparatus.

Further features of the present invention will become apparent from the following description of exemplary embodiments with reference to the attached drawings.

BRIEF DESCRIPTION OF THE DRAWINGS

FIG. 9 is a diagram illustrating a deviation in the sub-scanning direction of the scan line, an effect which is obtained when step S8-006 illustrated in FIG. 8 has been executed, and the like.

DESCRIPTION OF THE EMBODIMENTS

An exemplary embodiment for embodying the invention will be described hereinbelow with reference to the drawings.

Figure 1:
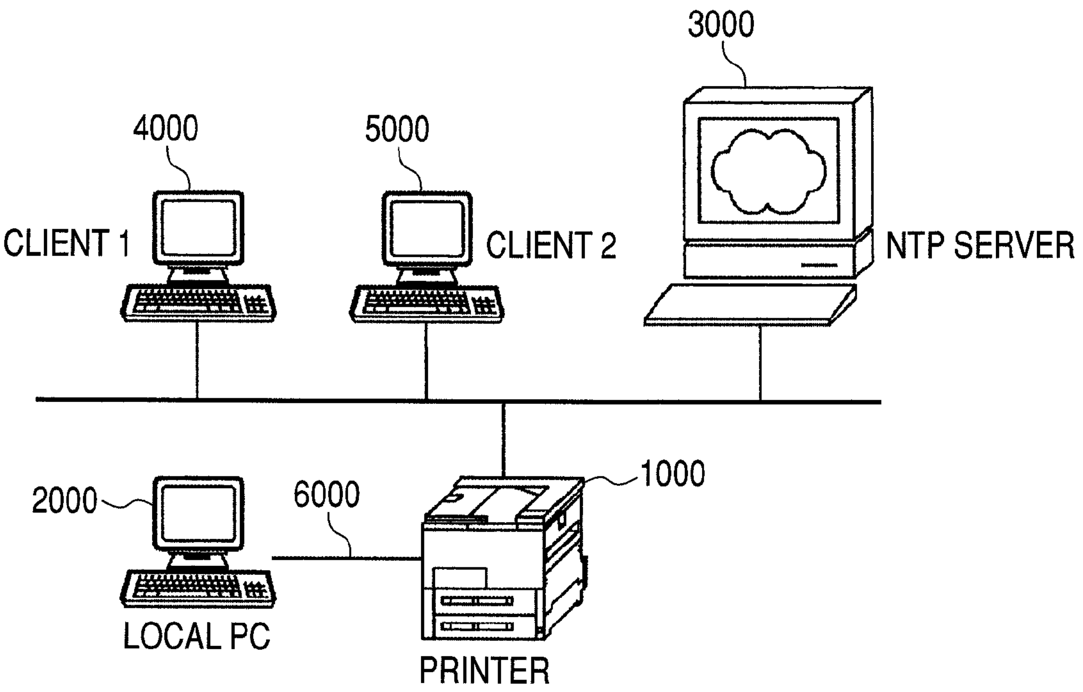
FIG. 1 is a schematic diagram illustrating a using environment of an image forming apparatus (hereinbelow, also referred to as a printer) in an embodiment of the invention.

FIG. 1 is a schematic diagram illustrating a using environment of an image forming system including an image forming apparatus (hereinbelow, also referred to as a printer) in the embodiment of the invention.

A printer 1000 in the embodiment is connected to a local PC 2000 through a USB cable 6000. The printer 1000 also has a network connecting function and can also communicate with an NTP (Network Time Protocol) server 3000, a PC 4000 of a client 1, a PC 5000 of a client 2, or the like through a network 7000.

Figure 2:
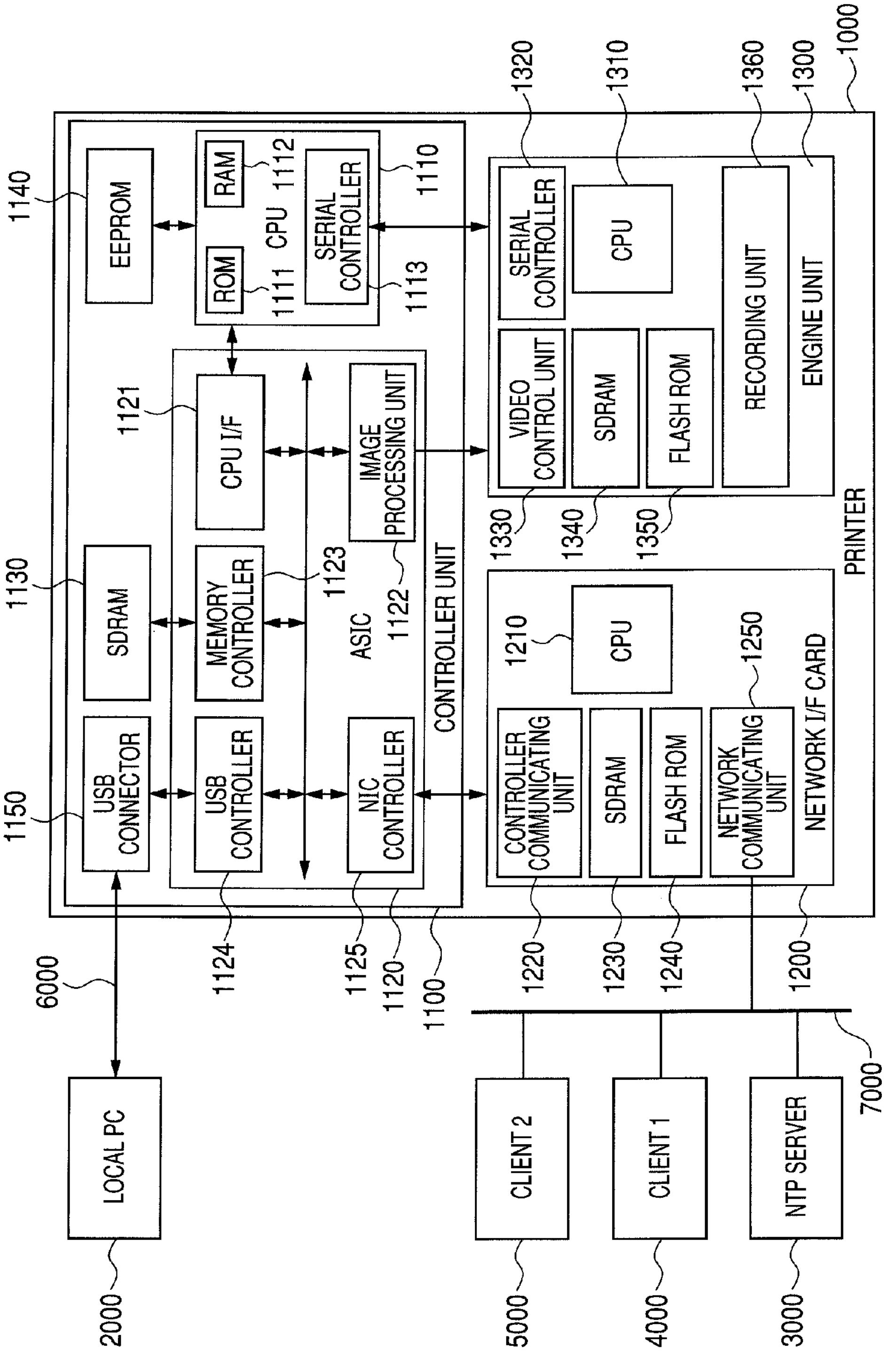
FIG. 2 is a block diagram illustrating a printer 1000 illustrated in FIG. 1 in the embodiment of the invention.

FIG. 2 is a block diagram illustrating the printer 1000 illustrated in FIG. 1 in the embodiment of the invention.

Figure 3:
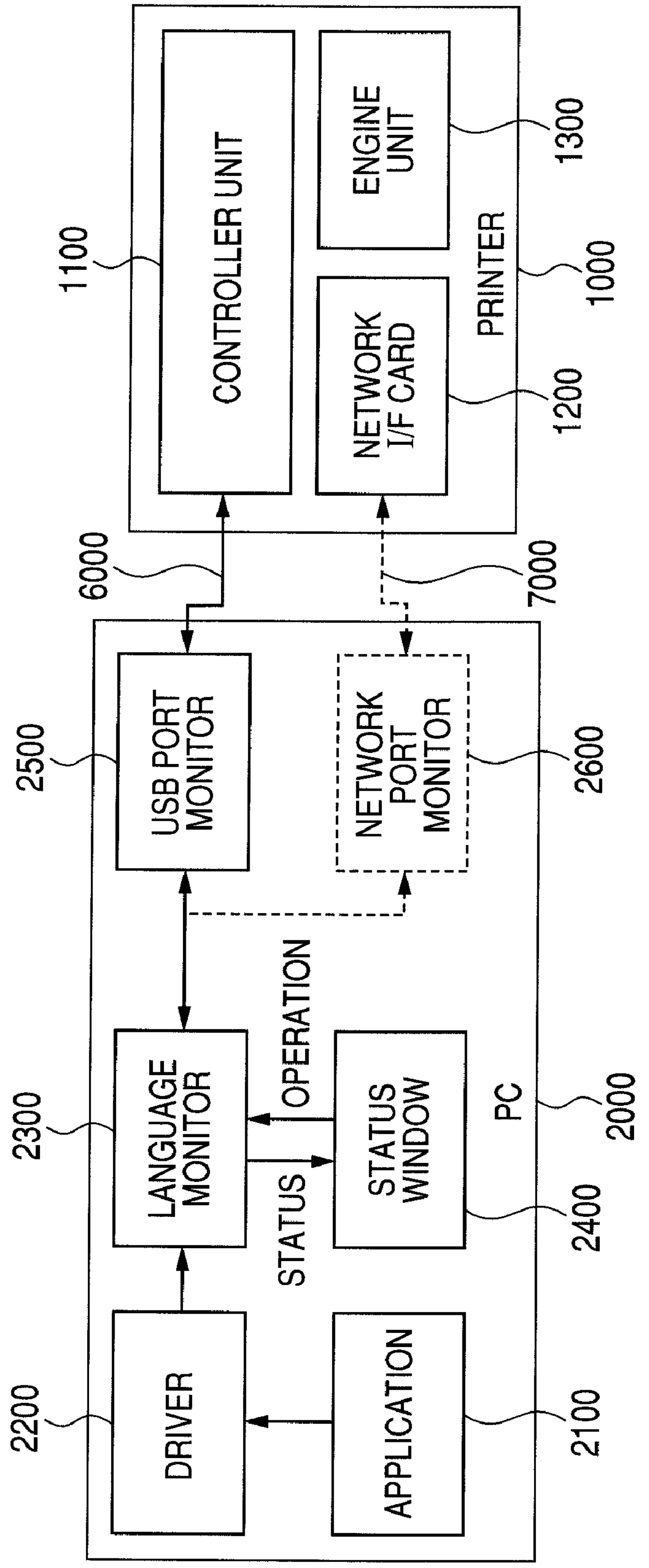
FIG. 3 is a block diagram illustrating a construction of software which operates in a local PC 2000 or a PC 4000 of a client 1 illustrated in FIG. 1 in the embodiment of the invention with respect to the local PC 2000 as a representative example.

FIG. 3 is a block diagram illustrating a construction of software which operates in the local PC 2000 or the PC 4000 of the client 1 illustrated in FIG. 1 in the embodiment of the invention with respect to the local PC 2000 as a representative example.

The printer and a main flow of the printing operation of the printer in the embodiment will now be described hereinbelow with reference to FIGS. 2 and 3.

The printer 1000 in the embodiment is constructed mainly by a controller unit 1100, a network interface card (hereinbelow, abbreviated to NIC) 1200, and an engine unit 1300.

The printer 1000 is designed on the assumption that rendering or print control of a print image operates on a computer such as local PC 2000, PC 4000 of the client 1, PC 5000 of the client 2, or the like. When describing in more detail, the rendering or print control of the print image is executed by a driver 2200 or a language monitor 2300 illustrated in FIG. 3. Therefore, the controller unit 1100 has only a CPU 1110, an ASIC 1120, an SDRAM 1130, an EEPROM 1140, and a USB connector 1150.

The CPU 1110 has therein: a ROM 1111 and a RAM 1112 each having a capacity which is extremely smaller than a capacity of the printer for executing the rendering or print control by itself; and a serial controller 1113 for making serial communication with the engine unit 1300. Various kinds of control programs and various kinds of initial values have been stored in the ROM 1111. Not only a work area but also an area for storing data excluding image data which is handled by the controller unit 1100 are prepared in the RAM 1112. Since the RAM 1112 is a volatile RAM, limited information such as various kinds of counter values and the like which have to be held even after a power source was turned off is stored in the EEPROM 1140.

The ASIC 1120 is a package in which a CPU interface (I/F) 1121, an image processing unit 1122, a memory controller 1123, a USB controller 1124, and an NIC controller 1125 are combined. For example, when a printing process is executed by an application 2100 on the local PC 2000, the driver 2200 is activated and image data for printing is formed.

In the printer 1000 of the embodiment, as will be described hereinafter, a digital correcting process in the sub-scanning direction of the scan line for the print which is executed by the application 2100 is executed in the driver 2200.

The formed image data is sent to the language monitor 2300. The language monitor 2300 transfers both of various kinds of commands for controlling the print and the formed image data to the printer 1000 through a USB port monitor 2500 and the USB cable 6000 based on a predetermined protocol.

In the printer 1000, the transferred commands and data are received by the USB controller 1124 through the USB cable 6000 and the USB connector 1150. The CPU 1110 always monitors a state of the USB controller 1124 through the CPU interface (I/F) 1121.

If the command was received, a process corresponding to the command is executed. If the command is a command which needs a response, the CPU 1110 controls the USB controller 1124 through the CPU interface (I/F) 1121 and returns response status data to the local PC 2000. The returned status is sent to the language monitor 2300 through the USB cable 6000 and the USB port monitor 2500 and a status window 2400 is further notified of contents of the status. The status window 2400 properly displays the printer and a print situation to a display unit of the local PC 2000 according to the notified status.

When the CPU 1110 receives a command for transferring the rendered print image, it controls the USB controller 1124 and the memory controller 1123, thereby allowing image data subsequent to the command to be stored into the SDRAM 1130.

When a certain amount of image data is stored into the SDRAM 1130, the language monitor 2300 issues an activation request command of the engine unit 1300. When the CPU 1110 recognizes the activation request command, it controls the serial controller 1113 and notifies the engine unit 1300 of an activating request. If the CPU 1110 is notified through the serial controller 1113 that the engine unit 1300 has normally been activated and the sheet has correctly been conveyed, the CPU 1110 controls the memory controller 1123 and the image processing unit 1122. The CPU 1110 further converts the image data stored in the SDRAM 1130 into a video signal which is needed by the engine unit 1300 in the actual printing operation and transmits the video signal to the engine unit 1300.

The engine unit 1300 has a CPU 1310, a serial controller 1320, a video (VIDEO) control unit 1330, an SDRAM 1340, a FLASH ROM 1350, and a recording unit 1360. The CPU 1310 controls the operation of the whole engine unit. The video control unit 1330 receives the video signal sent from the controller unit 1100. The SDRAM 1340 has a work area and an area for holding values showing various kinds of states. The FLASH ROM 1350 stores programs which are executed in the CPU 1310, various kinds of table values which are referred to, and the like. The recording unit 1360 is constructed by a sheet conveying system, a toner supplementing system, a laser beam control system, an intermediate transfer system, a fixing device system, and the like.

When the CPU 1310 receives an activating request of the recording unit 1360 or a sheet conveying request from the controller unit 1100, the CPU 1310 property controls the recording unit 1360 and notifies the controller unit 1100 of the state as necessary. If the image formation is started, the video (VIDEO) control unit 1330 is controlled so as to supply the video signal sent from the controller unit 1100 to the recording unit 1360, thereby allowing the recording unit 1360 to form an image.

Figure 11:
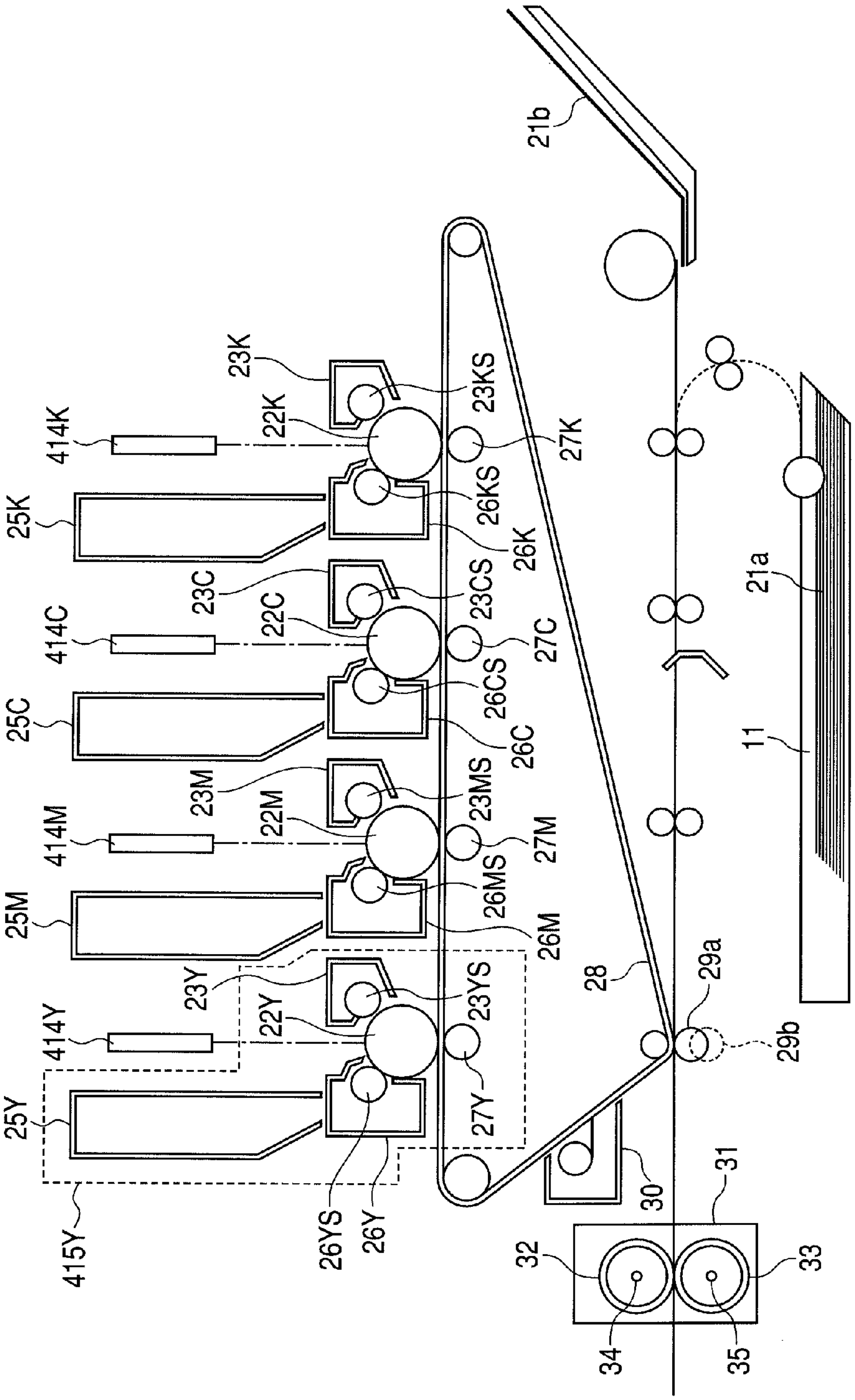
FIG. 11 is a diagram illustrating a recording unit in the first and second embodiments.

FIG. 11 illustrates an example of a laser printer of an electrophotographic system based on a tandem system using an intermediate transfer material 28 as an example of the recording unit 1360. The operation of the recording unit 1360 will now be described with reference to FIG. 11.

The recording unit 1360 drives exposure light based on the video signal processed by the controller unit 1100, forms an electrostatic latent image onto a photosensitive drum, that is, an image holding material, develops the electrostatic latent image, and forms a monochromatic toner image of each color component. By overlaying the monochromatic toner images on the intermediate transfer material 28, a multicolor toner image is formed. The multicolor toner image is transferred onto a print medium 11 and is thermally fixed. The intermediate transfer material is also an image holding material. A charging unit has four injection charging devices 23Y, 23M, 23C, and 23K for charging four photosensitive materials 22Y, 22M, 22C, and 22K every color of Y, M, C, and K. The injection charging devices have sleeves 23YS, 23MS, 23CS, and 23KS, respectively.

The image holding materials, that is, photosensitive materials (photosensitive drums) 22Y, 22M, 22C, and 22K are rotated counterclockwise by a driving motor according to the image forming operation. Scanner units 414Y, 414M, 414C, and 414K serving as exposing units irradiate the photosensitive materials 22Y, 22M, 22C, and 22K by exposure light and selectively expose the surfaces of the photosensitive materials 22Y, 22M, 22C, and 22K, respectively. Thus, electrostatic latent images are formed onto the surfaces of the photosensitive materials. Developing devices 26Y, 26M, 26C, and 26K serving as developing units develop the toner images of the colors of Y, M, C, and K in order to visualize the electrostatic latent images, respectively. Sleeves 26YS, 26MS, 26CS, and 26KS are provided for the developing devices, respectively. Each developing device is detachable. The scanner unit can perform a gradation expression of each pixel by a width or intensity of the laser beam.

Primary transfer rollers 27Y, 27M, 27C, and 27K serving as transfer units press the intermediate transfer material 28 which rotates clockwise onto the photosensitive materials 22Y, 22M, 22C, and 22K, thereby transferring the toner images on the photosensitive materials onto the intermediate transfer material 28. By applying a proper bias voltage to the primary transfer roller 27 and causing a difference between a rotational speed of the photosensitive material 22 and a rotational speed of the intermediate transfer material 28, the monochromatic toner image is efficiently transferred onto the intermediate transfer material 28. Such an operation is called a "primary transfer".

The multicolor toner image obtained by synthesizing the monochromatic toner images of Y, M, C, and K is conveyed to a secondary transfer roller 29 in association with the rotation of the intermediate transfer material 28. The multicolor toner image on the intermediate transfer material 28 is transferred onto the print medium 11 which has been sandwiched and conveyed from a sheet feeding tray 21 to the secondary transfer roller 29. A proper bias voltage is applied to the secondary transfer roller 29, so that the toner image is electrostatically transferred. Such an operation is called a "secondary transfer". While the multicolor toner image is being transferred onto the recording medium 11, the secondary transfer roller 29 is come into contact with the print medium 11 at a position 29*a*. After completion of a printing process, the secondary transfer roller 29 is removed to a position 29*b*.

In order to melting and fixing the multicolor toner image transferred onto the print medium 11 to the print medium 11, a fixing unit 31 has a fixing roller 32 for heating the print medium 11 and a pressing roller 33 for allowing the recording medium 11 to be come into pressure contact with the fixing roller 32. The fixing roller 32 and the pressing roller 33 are formed in a hollow shape and heaters 34 and 35 are built therein. The fixing unit 31 conveys the print medium 11 holding the multicolor toner image by the fixing roller 32 and the pressing roller 33 and applies a heat and a pressure, thereby fixing the toner onto the print medium 11.

The print medium 11 after the toner was fixed is subsequently ejected onto a discharge tray (not shown) by an ejecting roller (not shown) and finishes the image forming operation. A cleaning unit 30 cleans the toner remaining on the intermediate transfer material 28. The drain toner remaining after the multicolor toner image of four colors formed on the intermediate transfer material 28 was transferred to the recording medium 11 is stored in a cleaner container.

The status window 2400 illustrated in FIG. 3 can receive a user's operating request such as temporary stop or cancellation of the print. The operating request is properly sent to the language monitor 2300. The language monitor 2300 transfers a command according to the transferred operating request to the printer 1000 through the USB port monitor 2500 and the USB cable 6000 based on the foregoing predetermined protocol. Thus, a process according to the transferred command is executed by the controller unit 1100 as mentioned above.

The NIC 1200 has a CPU 1210, a controller communicating unit 1220, an SDRAM 1230, a FLASH ROM 1240, and a network communicating unit 1250. The CPU 1210 controls the operation of the whole NIC. The controller communicating unit 1220 controls communication with the controller unit 1100. The SDRAM 1230 has a work area and an area for holding values showing various kinds of states. The FLASH ROM 1240 stores programs which are executed in the CPU 1210, various kinds of table values which are referred to, and the like. The network communicating unit 1250 controls whole network communication based on TCP/IP.

One of roles of the NIC 1200 is to perform a mediation between the PC 4000 of the client 1, the PC 5000 of the client 2, or the like and the controller unit 1100. In each client, in addition to the same software as that of the driver 2200 or the language monitor 2300 on the local PC 2000, a network port monitor 2600 operates in place of the USB port monitor 2500. Various kinds of commands and the image data which are issued from the language monitor 2300 are transferred to the NIC 1200 through the network port monitor 2600 and the network 7000. The command received by the network communicating unit 1250 in the NIC 1200 is sent to the controller unit 1100 by controlling the controller communicating unit 1220. The controller unit 1100 also always monitors the NIC controller 1125 in a manner similar to the USB controller 1124. The controller unit 1100 processes the received command in a manner similar to the case of the USB mentioned above and returns status data to the NIC 1200 through the NIC controller 1125 as necessary. The NIC 1200 returns the status data received by the controller communicating unit 1220 to the client as a command issuing source side by controlling the network communicating unit 1250. The returned status data is sent to the status window 2400 from the language monitor 2300 in a manner similar to the case of the USB mentioned above and is properly displayed. The transmission and reception of the image data are also executed in a manner similar to the case of the USB mentioned above.

Another role of the NIC 1200 is to obtain time information by accessing the NTP server 3000 based on the NTP which is well-known in RFC-1305 and to further notify the controller unit 1100 of its contents as a command. An address of the NTP server 3000 can be set by a Web server installed in the NIC 1200. The set address information is stored in the FLASH ROM 1240 and is held even if a power source is turned off. Since the TCP/IP control and the NTP process are well-known and are not directly concerned with the invention, their detailed description is omitted here.

Figure 4:
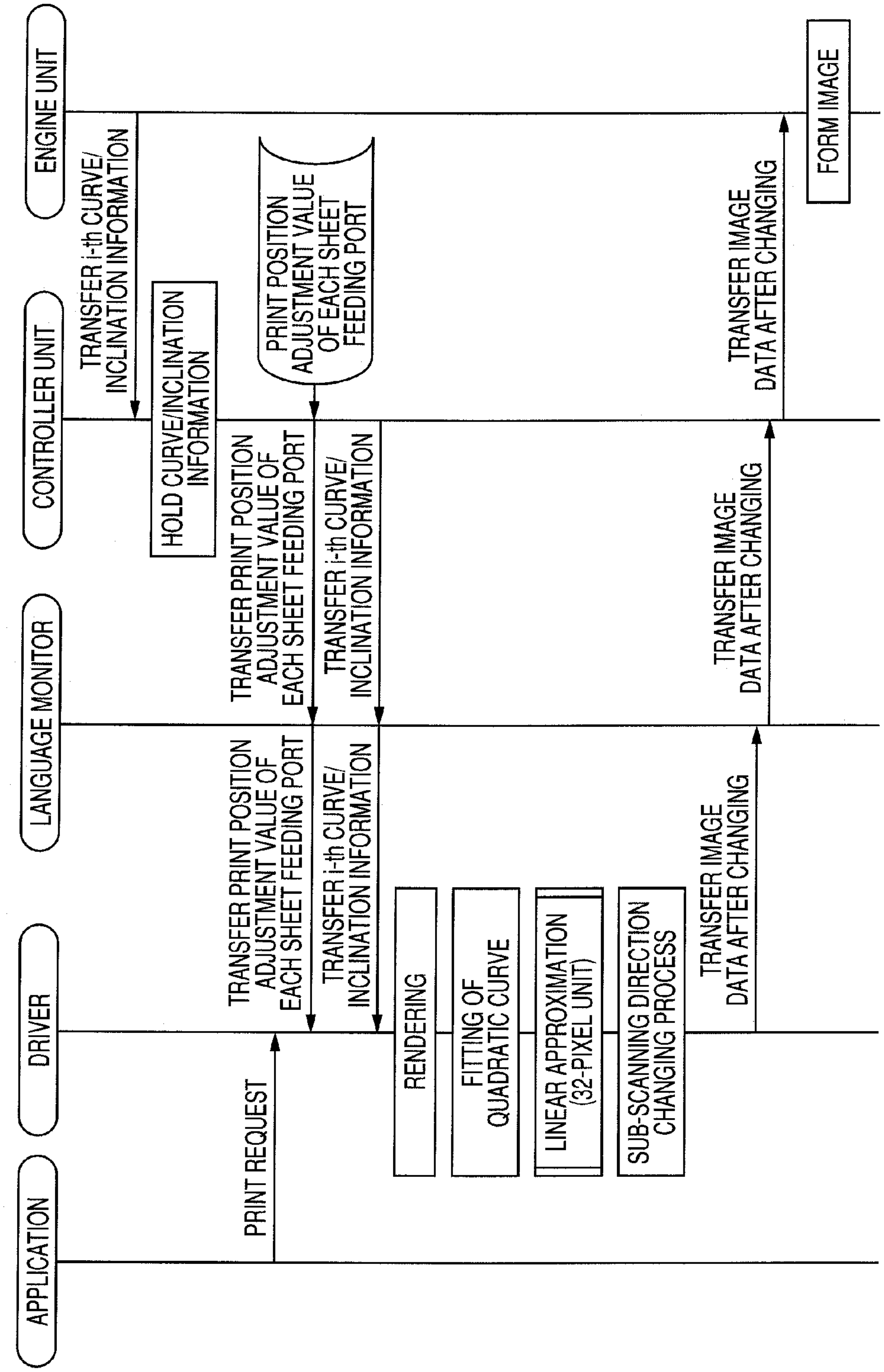
FIG. 4 is a diagram illustrating a relation between a block regarding a digital correction in a sub-scanning direction of a scan line to a print by an application 2100 illustrated in FIG. 3 and each process.

FIG. 4 is a diagram illustrating a relation between a block regarding a digital correction in a sub-scanning direction of a scan line for correcting an image distortion accompanied by a curve and a mechanical inclination (inclination due to an attaching precision) of the laser beam in the print by the printer illustrated in FIG. 3 and each process.

Figure 5:
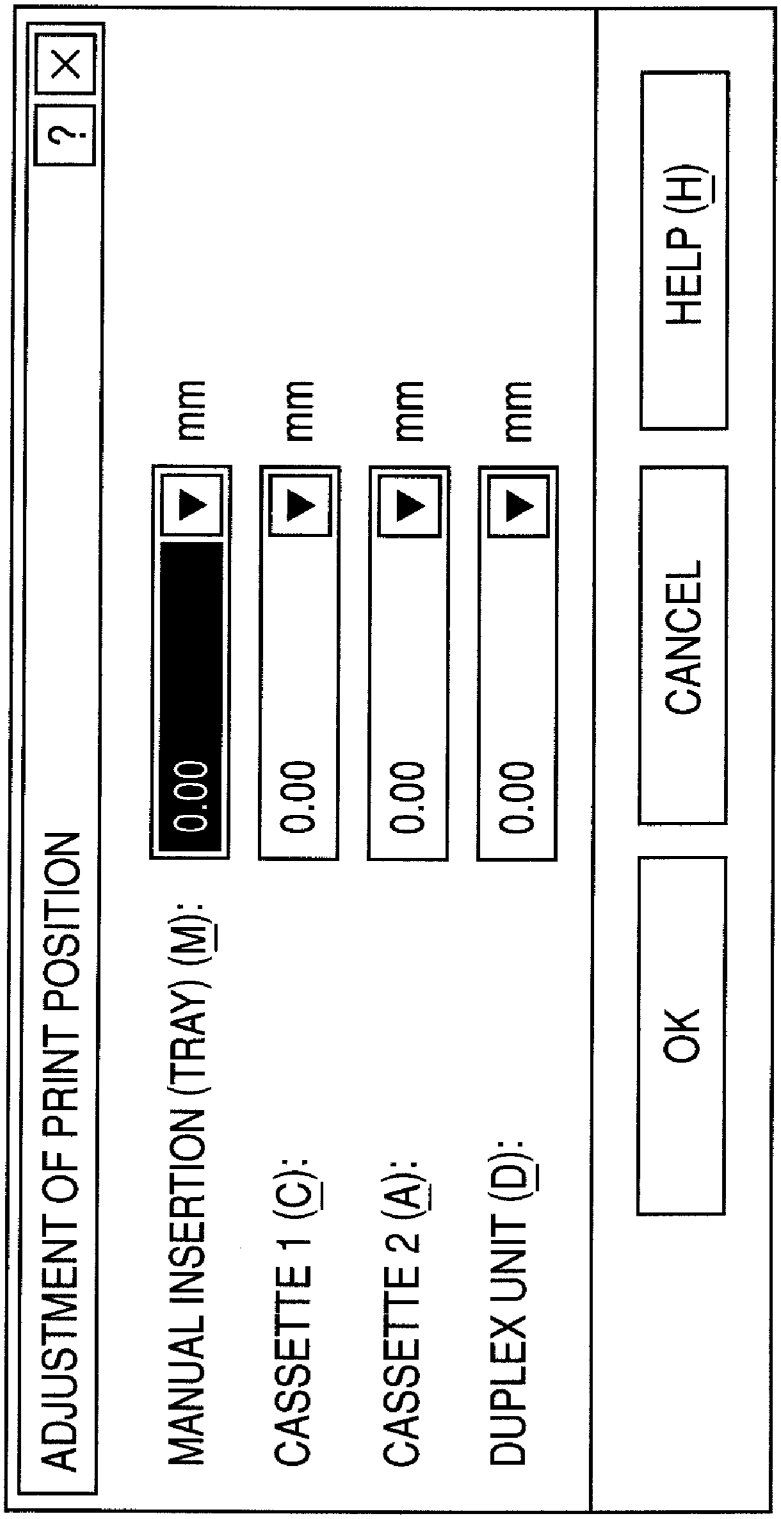
FIG. 5 is a diagram illustrating a dialog box which is displayed by selecting a menu of a status window 2400 illustrated in FIG. 3 and which sets an adjustment value of a print position of each sheet feeding port.

FIG. 5 is a diagram illustrating a dialog box which is displayed by selecting a menu of the status window 2400 illustrated in FIG. 3 and which sets the print position adjustment value of each sheet feeding port. As described in the description of the related art, the reference position of the sheet is deviated in the main scanning direction from the ideal position due to the tolerance or the like of the sheet conveying mechanism. In the embodiment, the print position adjustment value of each sheet feeding port is used to adjust the image writing position and to shift the image in the sub-scanning direction (positional deviation correction) so as to compensate an influence of the curve and the mechanical inclination of the laser beam in correspondence to a deviation of a sheet feeding position as will be described hereinafter.

A flow of the digital correction in the sub-scanning direction of the scan line in the embodiment will be described hereinbelow with reference to FIGS. 4 and 5.

The controller unit 1100 illustrated in FIG. 3 preliminarily obtains information about the i-th curve and inclination measured at certain timing i from the engine unit 1300 and caches it into the RAM 1112 illustrated in FIG. 2.

The controller unit 1100 receives the print position adjustment value of each sheet feeding port which was input by the dialog box illustrated in FIG. 5 through the language monitor 2300 and stores into the EEPROM 1140. The print position adjustment value is held on a 0.1 mm unit basis. In the image forming apparatus of the embodiment, a menu for printing a pattern image (not shown) adapted to measure the deviation amount of the print position is provided for the status window 2400 illustrated in FIG. 3. By measuring a width between a sheet edge and the pattern image by using a ruler or the like, the user can know the deviation amount of the print position and can set the print position adjustment value as necessary.

When the user executes the print by using the application 2100 illustrated in FIG. 3, the driver 2200 is loaded onto the OS and a print request is sent from the application 2100 to the driver 2200.

When the driver 2200 is loaded onto the OS and the start of the print is instructed by the user, the driver 2200 obtains the print position adjustment value of each sheet feeding port held in the EEPROM 1140 through the language monitor 2300. When the process such as rendering or the like based on the print request from the application 2100 is completed, the driver 2200 is unloaded from the OS. It is, therefore, necessary for the driver 2200 to obtain the print position adjustment value each time it is loaded onto the OS. The print position adjustment value is input by using by the dialog box illustrated in FIG. 5 displayed by selecting the menu in the status window 2400. For example, it is necessary that the print position adjustment value input by the dialog box on the local PC 2000 is also referred to by the driver 2200 on the PC 4000 of the client 1. The image forming apparatus of the embodiment stores the print position adjustment value into the EEPROM 1140 in consideration of those requirements as to the print position adjustment value. Each time the driver 2200 is loaded onto the OS, the image forming apparatus transfers the print position adjustment value to the driver 2200 through the language monitor 2300.

At the same time, the information about the i-th curve and inclination cached in the controller unit 1100 is obtained. Subsequently, the driver 2200 executes the rendering process based on the print request.

It is assumed that the curve and the mechanical inclination of the laser beam in the embodiment can be fitted to a quadratic curve ($f(x)=ax^2+bx+c$) from the curve and inclination information (information of the positional deviation in the sub-scanning direction).

The driver 2200 obtains the quadratic curve from the curve and inclination information and, subsequently, executes a linear approximation as will be described hereinafter.

It is assumed here that a laser scanner unit in the embodiment is produced in such a manner that the curve and inclination f(x) in the sub-scanning direction of the scan line certainly lies within a range of less than 1 mm for 210 mm as a short side of the A4-size sheet with respect to the main scan width. That is, as described in the description of the related art, even if the linear approximation is performed on a 32-pixel unit basis, an error in the sub-scanning direction of the scan line lies within a range where it cannot be recognized by the eyes when the image is printed onto the sheet. Further, the driver 2200 executes a scan line changing process in the sub-scanning direction of the scan line based on a result of the linear approximation as will be described hereinafter.

Data obtained after completion of the scan line changing process in the sub-scanning direction of the scan line is transferred from the driver 2200 to the engine unit 1300 through the language monitor 2300 and the controller unit 1100.

The engine unit 1300 forms the image data after the changing process supplied as a video signal onto the sheet by the recording unit 1360 as described with reference to FIGS. 2 and 3.

Figure 6:
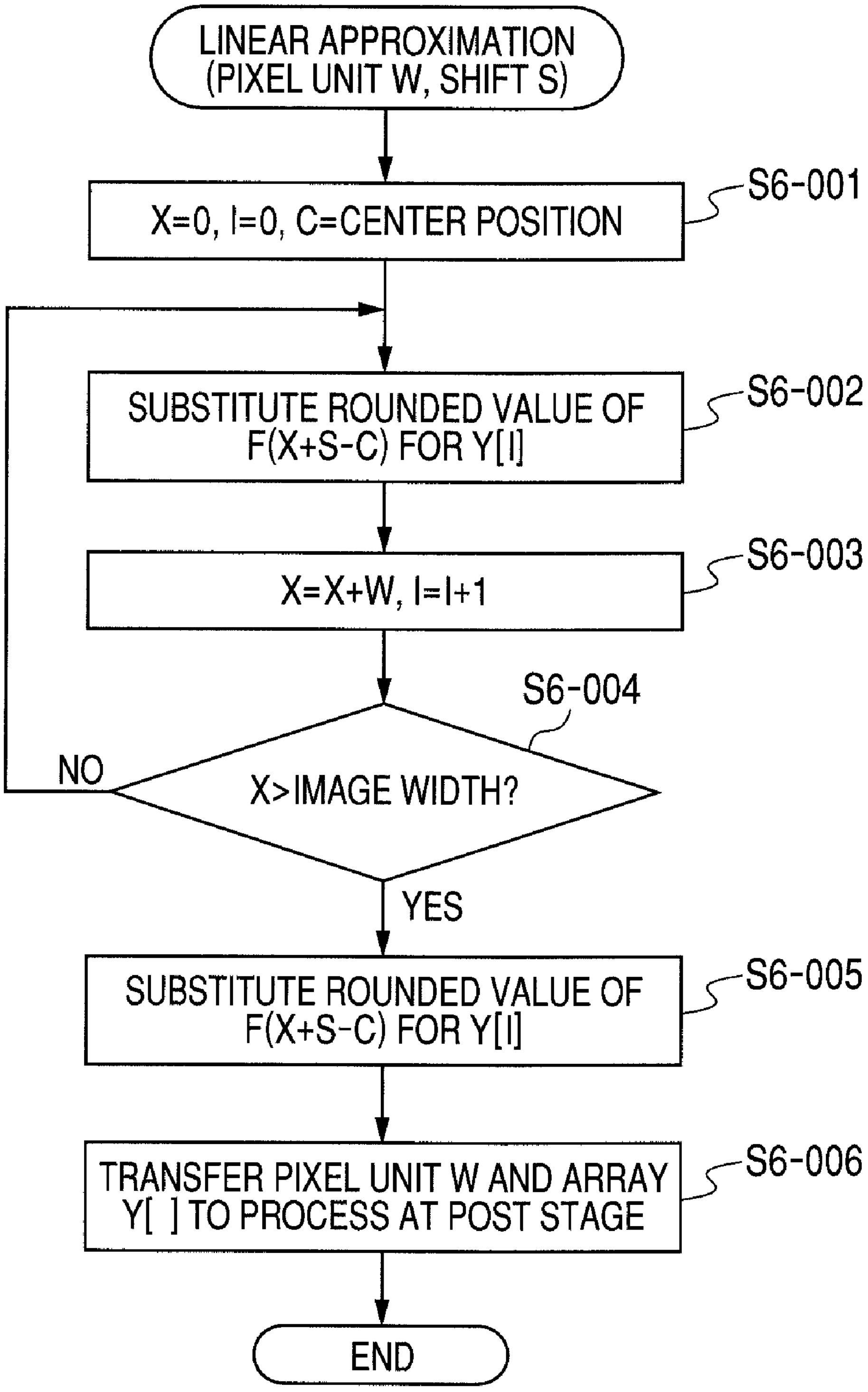
FIG. 6 is a flowchart showing, in detail, a linear approximating process illustrated in FIG. 4.

FIG. 6 is a flowchart showing, in detail, the linear approximating process illustrated in FIG. 4. A process in each step of the flowchart shown in FIG. 6 is executed by the CPU which has made the driver 2200 illustrated in FIG. 3 operative.

In a subroutine of the driver 2200, the linear approximating process is called from a main processing routine of the driver 2200 every page and obtains a pixel unit w (32 pixels in the embodiment) and a shift amount s as parameters. The shift amount indicates a movement amount of the writing position of the image based on the print position adjustment value of each sheet feeding port. Details of the shift amount will be described hereinafter.

First, in step S6-001, a position x in the main scanning direction and an index i of an array are initialized.

Hereinbelow, in step S6-002, when the number of pixels in a range from the left edge of the image to the center of the sheet is assumed to be c, x+s−c is given to the quadratic curve f(x) obtained by the fitting illustrated in FIG. 4 and its rounded value is substituted for an array y[i]. The driver 2200 set the left edge of the image to an origin in the main scanning direction and the quadratic curve f(x) sets the center of the sheet to the origin in the main scanning direction. Therefore, a conversion of a coordinate system is merely performed by using the number c of pixels in the range from the image left edge to the sheet center. By the above arithmetic operation, the quadratic curve can be linearly approximated also in consideration of a shift amount which is determined based on the print position adjustment value corresponding to each sheet feeding port. In the array y[i], the position in the main scanning direction is set to the correction amount (changing amount) in the sub-scanning direction in the i-th index.

In step S6-003, the position x in the main scanning direction is progressed by a distance corresponding to the pixel unit w and the index i of the array is incremented.

In step S6-004, whether or not x has exceeded the image width is discriminated. If it does not reach the image width yet, step S6-002 is repeated.

If it has reached the image width, step S6-005 follows and the linear approximation of the image end is executed. By the above processes, the array y[i] constructed by the correction amounts (changing amounts) in the sub-scanning direction at the respective positions in the range from the image left edge to the image end is obtained. Finally, in step S6-006, a preparation for transferring the pixel unit w and the array y[i] to the scan line changing process in the sub-scanning direction of the scan line at the post stage is performed and the linear approximating process is finished.

Figure 7:
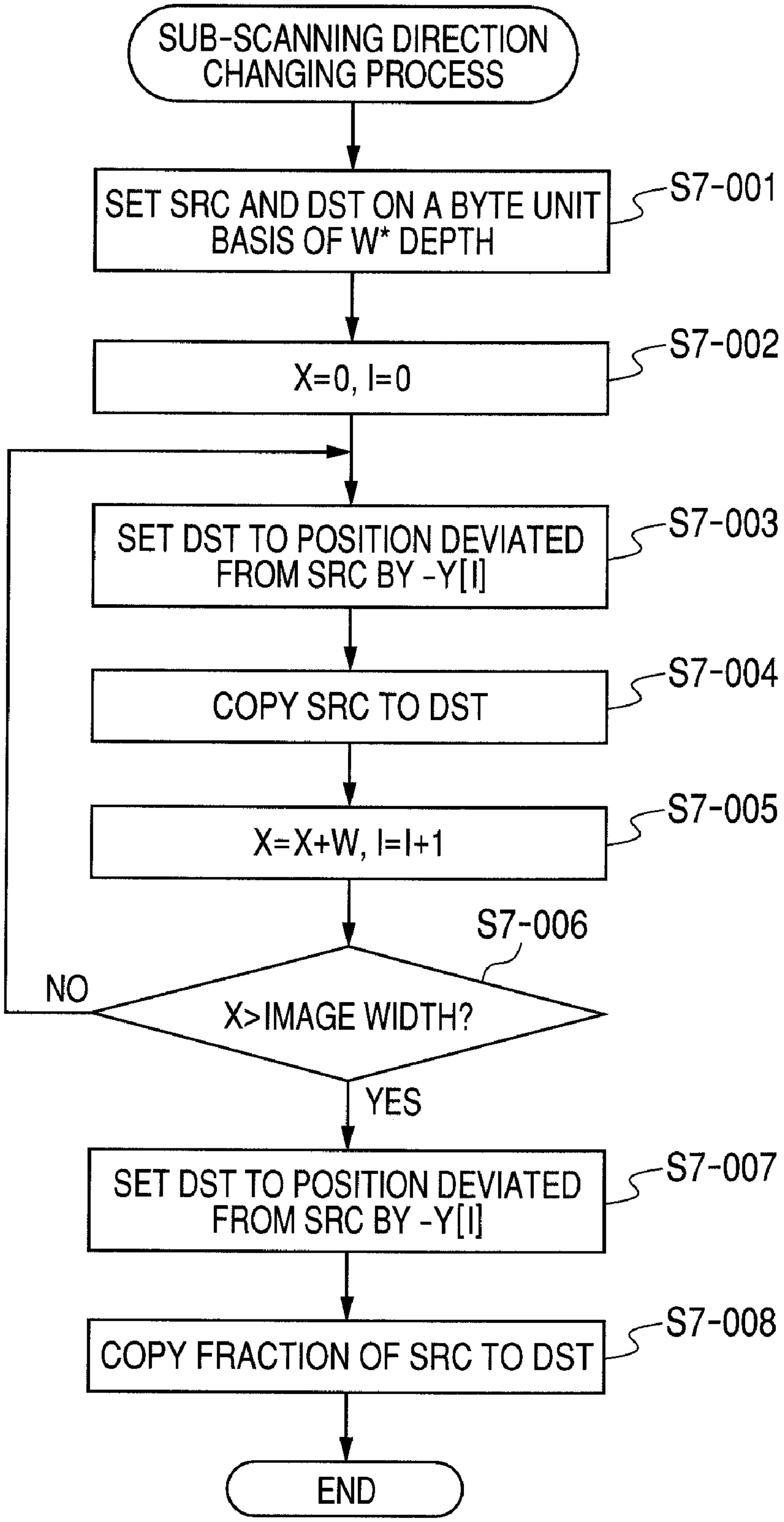
FIG. 7 is a flowchart showing, in detail, a scan line changing process in the sub-scanning direction of the scan line illustrated in FIG. 4.

FIG. 7 is a flowchart showing, in detail, the scan line changing process in the sub-scanning direction of the scan line illustrated in FIG. 4. By this process, the positional deviation in the sub-scanning direction of the pixel value of the image to be printed can be corrected. A process in each step of the flowchart shown in FIG. 7 is executed by the CPU which has made the driver 2200 illustrated in FIG. 3 operative.

First, in step S7-001, processing units of src and dst are determined from the pixel unit w which is succeeded from step S6-006 in FIG. 6 and the number of bits (depth) per pixel of the image data. For example, now assuming that w=32 (pixels) and depth=2, a processing unit is equal to 8 bytes.

Subsequently, in step S7-002, the position x in the main scanning direction and the index i of the array are initialized.

Hereinbelow, in step S7-003, dst is set to a position which is the same in the main scanning direction as the position of src as a processing target position in the print target image and is deviated in the sub-scanning direction of the scan line by a distance corresponding to −y[i] lines.

Subsequently, in step S7-004, contents (pixel value group) of the position of dst are copied to the position of src by an amount corresponding to the processing unit. For example, by properly adjusting a size of data which can be handled in a lump according to the processing unit here, the copy can be executed as quickly as possible. In this manner, the changing (correcting) process can be executed by the correction amount y[i] at each main scanning position calculated by using the shift amount which is decided based on the print position adjustment value of each sheet feeding port.

In step S7-005, the position x in the main scanning direction is progressed by the distance of the pixel unit w and the index i of the array is incremented.

In step S7-006, whether or not x has exceeded the image width is discriminated. If it does not reach the image width yet, step S7-003 is repeated.

If it has reached the image width, step S7-007 follows and the position of dst is set to the position of src in a manner similar to step S7-003.

Further, in step S7-008, a pixel value of a position of a fraction (remainder pixels at the time when the position x is progressed every pixel unit w) is copied to the position of dst and the changing process of one line of src in the sub-scanning direction of the scan line is finished.

The changing process is executed to all pixel values of one frame.

In the scan line changing process in the sub-scanning direction of the scan line illustrated in FIG. 4, the processes illustrated in FIG. 7 are repetitively executed so as to process all src lines.

Figure 8:
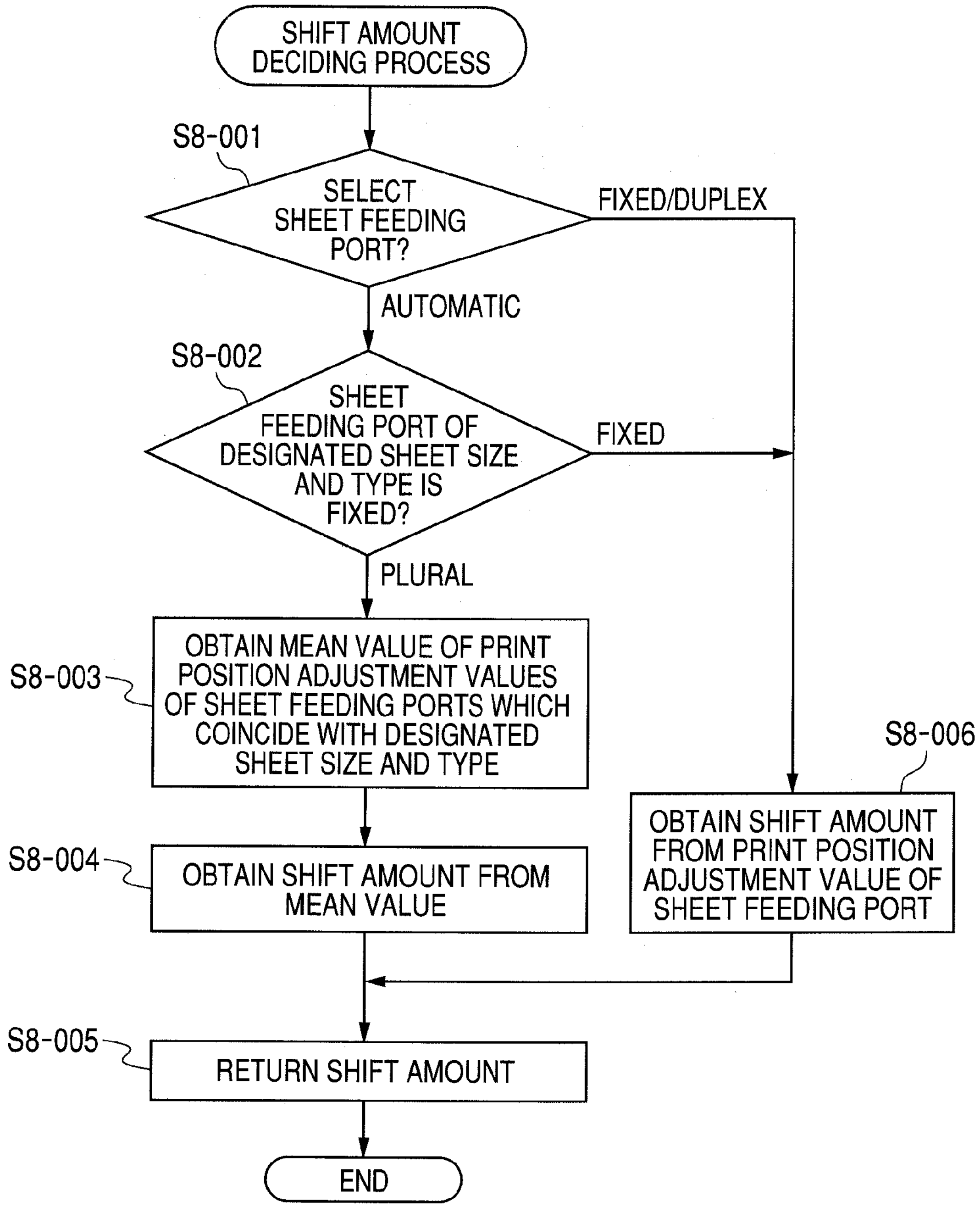
FIG. 8 is a flowchart showing, in detail, a process for deciding a shift amount adapted to move a writing position of an image based on a relation of a sheet size and a sheet type between a print job and each sheet feeding port and the adjustment value of the print position of each sheet feeding port.

FIG. 8 is a flowchart showing, in detail, a process for deciding a shift amount adapted to move the writing position of the image based on a relation of a sheet size and a sheet type between a print job and each sheet feeding port and the adjustment value of the print position of each sheet feeding port. A process in each step of the flowchart shown in FIG. 8 is executed by the CPU which has made the driver 2200 illustrated in FIG. 3 operative. The process in each step of the flowchart shown in FIG. 8 is executed just before the driver illustrated in FIG. 4 calls the linear approximating process every page.

First, in step S8-001, a sheet feeding port discrimination is made to decide which one of the sheet feeding ports is used to request the print of the page based on the print request from the application 2100 or the print request set in the driver 2200. That is, a sheet feeding discrimination is made to discriminate information of the sheet feeding port of the sheet which is used for printing in the print request. If an automatic sheet feeding mode has been requested so as to automatically select the sheet feeding port, step S8-002 follows. If NO, that is, if one sheet feeding port has been requested or the page has been fed from a duplex unit, step S8-006 follows.

In step S8-002 (discrimination of sheet attributes), by which sheet size and sheet type (plain paper, thick paper, etc.) in the print request the print of the image has been requested is confirmed, and the number of sheet feeding ports in which the sheets of such size and type have been set is examined. If a plurality of sheet feeding ports in which the sheets of the same size and type as the requested size and type have been enclosed exist, step S8-004 follows. If the number of sheet feeding ports in which the sheets of the requested size and type have been set is equal to one, step S8-006 follows. In step S8-003, the print position adjustment value of the sheet feeding port in which the sheets of the same size and type as the requested size and type have been set is extracted from all of the print position adjustment values obtained at the timing for transferring the print position adjustment value of each sheet feeding port illustrated in FIG. 4. Further, a mean value of the extracted print position adjustment values is obtained.

In step S8-004, the mean value of a mm unit obtained in step S8-003 is converted into a shift amount (dot unit) of a pixel unit. Thus, the correction amount regarding the main scan positional deviation can be determined. In step S8-005, a preparation for transferring the shift amount to the linear approximating process at the post stage is performed and the shift amount deciding process is finished.

In step S8-006, the shift amount of the pixel unit is obtained from the requested sheet feeding port or the print position adjustment value of the duplex unit and step S8-005 follows.

The shift amount in step S8-005 becomes the main scan positional deviation amount of the predetermined sheet feeding port (also including the automatic mode) for an ideal position (specified by the manufacturer).

Figure 9:
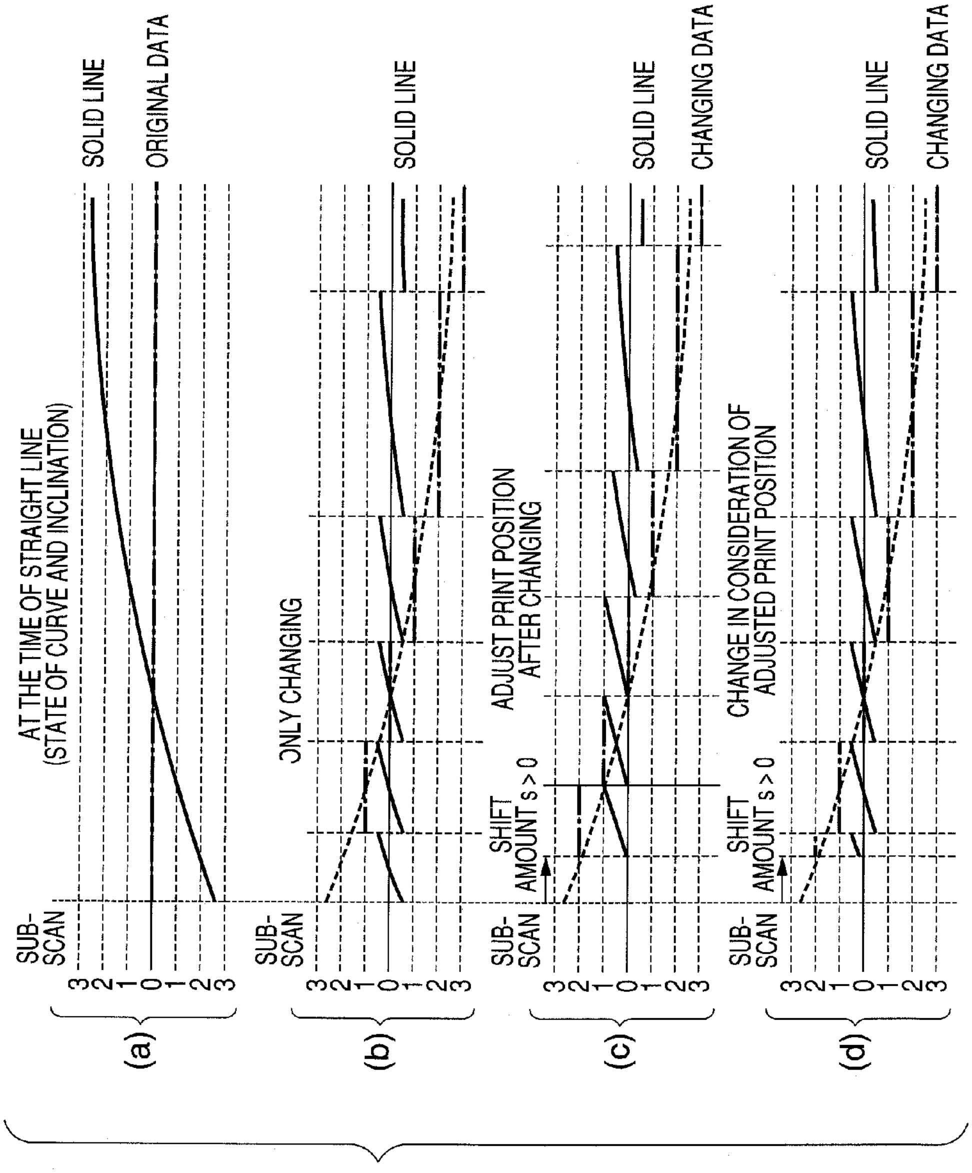

FIG. 9 is a diagram illustrating the deviation in the sub-scanning direction of the scan line, an effect which is obtained when step S8-006 illustrated in FIG. 8 has been executed, and the like.

In a portion (a) in FIG. 9, an image which is reconstructed in the case where a straight line shown by an alternate long and short dash line is formed as it is as an image by the engine unit 1300 is shown by a solid line. That is, states themselves of a curve and an inclination are illustrated.

A portion (b) in FIG. 9 relates to an example in the case where the linear approximation and the scan line changing process in the sub-scanning direction of the scan line have been executed in a state where the shift amount s=0. If the linear approximation is performed at the shift amount s=0 and the scan line changing process is executed based on the linear approximation with respect to the straight line shown by the alternate long and short dash line illustrated in the portion (a) in FIG. 9, it becomes as shown by a straight line shown by an alternate long and short dash line illustrated in the portion (b) in FIG. 9. When such a straight line is formed as an image by the engine unit 1300, it becomes as shown by a solid line. It will be understood that the solid line lies within a range of less than +1 line for a position of the sub-scan 0.

A portion (c) in FIG. 9 relates to an example in the case where the writing position has been shifted to the left at the shift amount s>0 after the changing process as also described in the description of the related art. When seeing the portion (c), it will be understood that in a portion near the writing position, that is, in a portion where the inclination of the quadratic curve is large, a center of gravity of the solid line has been moved to an upper side in the diagram. Although a movement amount of the center of gravity depends on the inclination of the quadratic curve, in the case of the portion (c), the center of gravity has been moved by a distance of about 0.5 line. Consider the case of drawing the red color with Y-plane and M-plane, for example. FIG. 9 shows the curve/inclination of Y-laser beam, the changing process for Y-plane and the actual drawing result for Y-plane. It is assumed that the curve/inclination of Y-laser beam and the curve/inclination of M-laser beam, not shown, are symmetric with respect to a line running through the position 0. If Y-plane as changed with the logic of portion (c) of FIG. 9 overlaps with M-plane as changed with the same logic, the two planes are likely to shift by one line in the portion near the writing position. This shift prevents reproducing the red color as a color in which Y-color and M-color properly overlap each other. Rather, it seems that Y-color and M-color separate from each other. Naturally, this is true of another color plane.

A portion (d) in FIG. 9 relates to an example in the case where step S8-005 illustrated in FIG. 8 in the embodiment has been executed. When seeing the portion (d), it will be understood that the movement of the center of gravity of the solid line seen in the portion (c) has been solved. By the above construction, the positional deviation in the sub-scanning direction of the image which is printed can be corrected by using the correction amount regarding the main scan positional deviation which is decided based on the print position of each sheet feeding port and the information of the positional deviation in the sub-scanning direction of the image forming apparatus.

By constructing as mentioned above, the deviation in the sub-scanning direction of the scan line accompanied by the correction of the main scan positional deviation of each sheet feeding port can be reduced as much as possible.

ANOTHER EMBODIMENT

The invention has been described above as an example with respect to the printing system of what is called a host base in which the rendering and the print control of the print image are executed on an information processing terminal such as a local PC 2000.

The above technique is not limited to the printing system of the host base. Even in a printer which receives what is called a page description language (hereinbelow, abbreviated to PDL) and executes the rendering of a print image based on the received PDL in the printer, a similar effect can be obtained in the case of such a construction that the sheet feeding port cannot be specified at the stage of executing the digital correction in the sub-scanning direction of the scan line.

Figure 10:
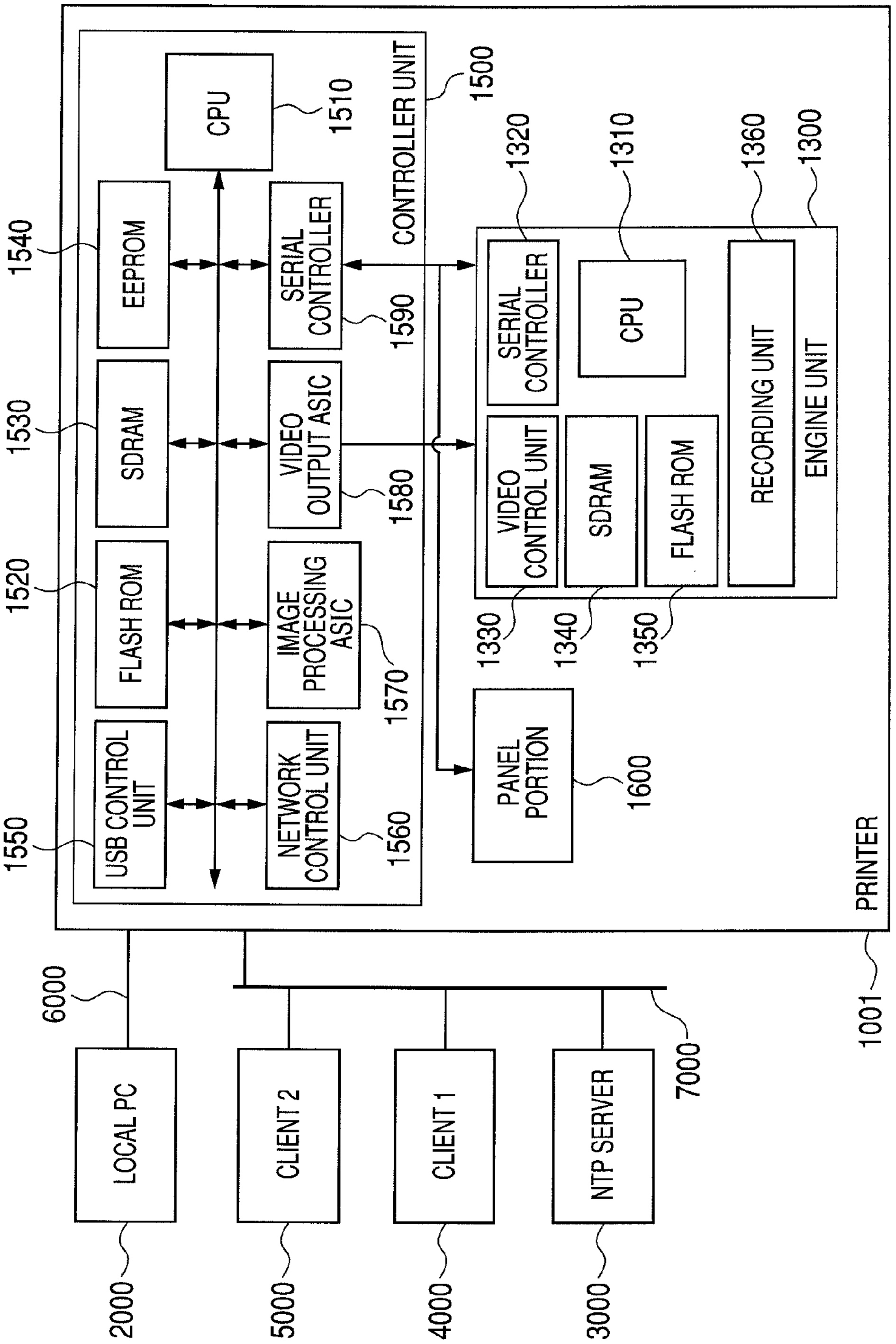
FIG. 10 is a block diagram illustrating a printer in the second embodiment in which the sheet feeding port cannot be specified at a stage of executing a digital correction in a sub-scanning direction of a scan line.

FIG. 10 is a block diagram illustrating a printer in the second embodiment in which the sheet feeding port cannot be specified at the stage of executing the digital correction in the sub-scanning direction of the scan line.

A printer in another embodiment and a flow of its printing operation will be described hereinbelow with reference to FIG. 10.

A printer 1001 in another embodiment is connected to the local PC 2000 through the USB cable 6000 in a manner similar to the printer 1000 illustrated in FIG. 1. The printer 1001 has a network connecting function and can also communicate with the NTP server 3000, the PC 4000 of the client 1, the PC 5000 of the client 2, or the like through the network 7000.

The printer 1001 is constructed by a controller unit 1500, a panel portion 1600, and the same engine unit 1300 as that illustrated in FIG. 2. A detailed description of the engine unit 1300 is omitted here.

The panel portion 1600 has a display unit constructed by several LEDs or LCDs and an input unit constructed by several buttons and displays a state of the printer or receives an input of various settings by the user. The print position adjustment value of each sheet feeding port can be changed from a menu of the print position adjustment in a manner similar to the embodiment described above.

The controller unit 1500 has a CPU 1510, a FLASH ROM 1520, an SDRAM 1530, an EEPROM 1540, a USB control unit 1550, a network control unit 1560, and a serial controller 1590. The controller unit 1500 also has an image processing ASIC 1570 and a VIDEO output ASIC 1580.

The CPU 1510 controls the operation of the whole controller unit. The embodiment will be described in detail together with a description of the image processing ASIC 1570 and the VIDEO output ASIC 1580.

The FLASH ROM 1520 stores programs which are executed in the CPU 1510, various kinds of table values which are referred to, and the like.

The SDRAM 1530 has an area for holding the image data, a work area, and an area for holding values showing various kinds of states.

Limited information such as various counter values and the like which have to be held even if a power source is turned off is stored in the EEPROM 1540. The print position adjustment value of each sheet feeding port which was input by using the panel portion 1600 is also stored in the EEPROM 1540.

The USB control unit 1550 plays roles similar to those of the USB controller 1124 and the USB connector 1150 illustrated in FIG. 2. The network control unit 1560 plays a role similar to that of the network communicating unit 1250 illustrated in FIG. 2.

The image processing ASIC 1570 executes the rendering of the print image based on the PDL according to register settings made by the program which operates on the CPU 1510. The image processing ASIC 1570 also executes the scan line changing process in the sub-scanning direction illustrated in FIG. 7. Those operations are a feature of the second embodiment. A print image obtained by executing the rendering and the changing process is temporarily stored into the SDRAM 1530. The print images obtained after executing the rendering and the changing process can be stored in the SDRAM 1530 by an amount of up to four pages in order to make the most of a print ability of the engine unit 1300.

Prior to setting each page of the image processing ASIC 1570, the programs which have been stored in the FLASH ROM 1520 and illustrated in FIGS. 6 and 8 are executed on the CPU 1510. Details of the processes are similar to those described in the first embodiment.

The VIDEO output ASIC 1580 adjusts the main/sub-scan writing positions of the print image held in the SDRAM 1530 so as to satisfy a blank designated by the PDL according to the register settings made by the program which operates on the CPU 1510. The adjusted video signal is sent to the engine unit 1300. The print position is also adjusted according to the register settings of the VIDEO output ASIC 1580 by the program which operates on the CPU 1510.

The serial controller 1590 plays a role similar to that of the serial controller 1113 illustrated in FIG. 2.

By constructing as mentioned above, also in the printer in another embodiment, the deviation in the sub-scanning direction of the scan line accompanied by the correction of the main scan positional deviation of each sheet feeding port can be reduced as much as possible.

According to the printer in another embodiment, for example, when an automatic switching of the sheet feeding port due to the absence of the sheets has occurred, the print images obtained so far after executing the rendering and the changing process are abandoned and a print image can be also newly formed again. However, to realize such a process, the PDLs of up to four pages have to be held until the print of each page is finished. Since the rendering and the changing process are executed again, the print ability of the engine unit 1300 deteriorates slightly. Returning to the case of the embodiment 1, there is such an advantage that a predetermined effect is obtained while making the most of the print ability of the engine without increasing the number of resources such as a memory and the like as compared with the embodiment 2.

STILL ANOTHER EMBODIMENT

In the foregoing embodiments, the print position adjustment value of each sheet feeding port can be properly changed by the user.

However, it is not always necessary to use such a construction that the print position adjustment value can be changed by the user. For example, a similar effect can be also obtained by a construction in which the main scan positional deviation amount of each sheet feeding port is measured at the time of shipping from a factory and the deviation amount is held in the FLASH ROM 1350 in the engine unit.

In the foregoing embodiment, when the sheet feeding port is automatically selected, the sheet feeding ports in which the sheets of the same size and type as the requested size and type have been set are searched for and a mean value of the print position adjustment values of the sheet feeding ports is obtained. By constructing as mentioned above, for example, in the case of the printer described above, in all of the sheet feeding ports in which the sheets of the same sheet size and type have been set, each deviation can be reduced as much as possible at the timing for producing a print job. However, a similar effect can be also obtained by a construction in which a mean value of not only the sheet feeding ports in which the sheets of the same sheet size and type have been set but also the print position adjustment values of all of the sheet feeding ports excluding the duplex unit is used. When constructing as mentioned above, a similar effect can be also obtained even in a case where, for example, after the print job was formed, the sheet size and type of the sheet feeding port out of the targets which are used to obtain the mean value are changed to the requested size and type, and the sheet feeding port is switched to the sheet feeding port in which the sheet size and type were changed.

Even in the description of any of the foregoing embodiments, the construction in which although there is a difference between the number of target sheet feeding ports, the mean value of all of them is obtained has been described. However, it is not always necessary to use such a construction that the mean value of the sheet feeding ports is obtained. For example, among the reasonable host base printers, there are many printers each having only three devices such as tray, standard cassette, and optional cassette as sheet feeding ports. In the case where the number of sheet feeding ports which can be automatically selected is relatively small as mentioned above, a similar effect can be also obtained by a construction in which a shift amount which is used only in the deviation correcting process in the sub-scanning direction of the scan line at the time of the automatic sheet feed selection is separately prepared. When describing in more detail, a column where an automatic sheet feed adjustment value which is used only in the deviation correcting process in the sub-scanning direction of the scan line at the time of the automatic sheet feed selection can be input is added to the dialog box illustrated in FIG. 5. The automatic sheet feed adjustment value which was input is held in the EEPROM 1140 in a manner similar to another value. The processing routine is changed in such a manner that in step S8-003 shown in FIG. 8, the mean value is not obtained but the automatic sheet feed adjustment value is obtained from the EEPROM 1140. In addition, in step S8-004, the shift amount is not obtained from the mean value but the processing routine is changed so as to obtain the shift amount from the automatic sheet feed adjustment value obtained in step S8-003. By constructing as mentioned above, a similar effect can be obtained. Naturally, it is not always necessary to use the construction in which the automatic sheet feed adjustment value can be changed by the user. As mentioned above, for example, even in such a construction that the automatic sheet feed adjustment value is held into the FLASH ROM 1350 in the engine unit upon shipping from the factory, a similar effect can be obtained. Further, in a more reasonable printer, a method of executing the deviation correcting process in the sub-scanning direction of the scan line accompanied by the correction of the main scan positional deviation of each sheet feeding port only when the sheet feeding port can be specified is also considered. By constructing as mentioned above, there is a possibility that the correction of the deviation in the sub-scanning direction of the scan line at the time of the automatic sheet feeding selection becomes incorrect. However, when the sheet feeding port can be specified, the effect of reducing the deviation in the sub-scanning direction of the scan line accompanied by the correction of the main scan positional deviation of each sheet feeding port can be obtained while suppressing the costs.

Each of the above embodiments has been described with respect to the printer. However, the invention is not limited to the printer but can be also applied to an MFP having a reading unit.

According to the foregoing embodiments, the deviation in the sub-scanning direction of the scan line accompanied by the correction of the main scan positional deviation of each sheet feeding port can be reduced. When the sheet feeding port can be specified, the deviation in the sub-scanning direction of the scan line accompanied by the correction of the main scan positional deviation of each sheet feeding port can be reduced.

It is also possible to construct in such a manner that a storage medium in which program codes for realizing the functions of the embodiments mentioned above have been recorded is supplied to a system or an apparatus and a computer of the system or apparatus reads out and executes the program codes stored in the storage medium. In this case, the program codes themselves read out of the storage medium realize the functions of the embodiments mentioned above and the program codes themselves and the storage medium in which the program codes have been stored also construct the invention.

The invention is also applied to a case where the program codes read out of the storage medium are written into a function expanding card inserted in the computer or a memory equipped for a function expanding unit connected to the computer. In such a case, a CPU or the like equipped for the function expanding card or the function expanding unit executes a part or all of actual processes based on instructions of the written program codes and the functions of the embodiments mentioned above are realized by those processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-165079, filed Jun. 24, 2008, which is hereby incorporated by reference herein in its entirety.

What is claimed is:

1. An image processing apparatus for transmitting an image to be printed to an image forming apparatus, comprising:

a receiving unit that receives from the image forming apparatus an adjustment value of a print position for each sheet feeding port of a plurality of sheet feeding ports, the adjustment value corresponding to a deviation in a main scanning direction of a sheet feeding position;

a discriminating unit that discriminates information of a sheet feeding port of a sheet which is used to print based on a print request, to determine at least one sheet feeding port for printing;

a correction amount deciding unit that decides a correction amount in the main scanning direction for a main scan positional deviation of the at least one sheet feeding port determined by the discriminating unit based on a result of the discrimination of the discriminating unit and a corresponding adjustment value received by the receiving unit; and a sub-scan positional deviation correcting unit that corrects a positional deviation in a sub-scanning direction of the image to be printed by using both (i) the correction amount decided by the correction amount deciding unit and (ii) information showing the positional deviation in the sub-scanning direction of the image forming apparatus.

2. An apparatus according to claim 1, wherein the discriminating unit comprises:

a sheet feeding port discriminating unit that discriminates whether the print request indicates (i) a mode for automatically selecting a proper one of the plurality of sheet feeding ports and printing or (ii) a mode for designating one of the plurality of sheet feeding ports and printing; and a sheet attribute discriminating unit that discriminates whether only one of a plurality of sheet feeding ports in which the sheets of a same size and/or a same type as a sheet size and/or sheet type designated by the print request exists, or a plurality of sheet feeding ports in which the sheets of a same size and/or a same type as a sheet size and/or a sheet type designated by the print request exist.

3. An apparatus according to claim 1, wherein when the discrimination result of the discriminating unit indicates that a number of appropriate sheet feeding ports is limited to one sheet feeding port, the correction amount deciding unit decides the correction amount based on an adjustment value received by the receiving unit corresponding to the one sheet feeding port.

4. An apparatus according to claim 1, wherein when the discrimination result of the discriminating unit indicates that a plurality of appropriate sheet feeding ports exist, the correction amount deciding unit decides the correction amount based on a mean value of a plurality of adjustment values received by the receiving unit corresponding to the plurality of appropriate sheet feeding ports.

5. An apparatus according to claim 1, wherein when the discrimination result of the discriminating unit indicates that a plurality of appropriate sheet feeding ports exist, the correction amount deciding unit decides the correction amount based on a predetermined value.

6. An apparatus according to claim 5, wherein the predetermined value is the same as in a state of no correction.

7. An image forming system comprising:

an image forming apparatus that comprises:

a printing unit;

a holding unit that holds an adjustment value of a print position for each sheet feeding port of a plurality of sheet feeding ports, the adjustment value corresponding to a deviation in a main scanning direction of a sheet feeding position, and a notifying unit that notifies the information processing terminal of the adjustment values held by the holding unit; and an information processing terminal that comprises:

a receiving unit that receives the adjustment values notified by the notifying unit of the image forming apparatus;

a discriminating unit that discriminates information of a sheet feeding port of a sheet which is used for printing based on a print request, to determine at least one sheet feeding port for printing;

a correction amount deciding unit that decides a correction amount in the main scanning direction for a main scan positional deviation of the at least one sheet feeding port determined by the discriminating unit based on a result of the discrimination of the discriminating unit and a corresponding adjustment value received by the receiving unit; and a sub-scan positional deviation correcting unit that corrects a positional deviation in a sub-scanning direction of the image to be printed by using both (i) the correction amount decided by the correction amount deciding unit and (ii) information showing the positional deviation in the sub-scanning direction of the image forming apparatus.

8. A system according to claim 7, wherein the discriminating unit of the information processing terminal comprises:

a sheet feeding port discriminating unit that discriminates whether the print request indicates (i) a mode for automatically selecting a proper one of the plurality of sheet feeding ports and printing or (ii) a mode for designating one of the plurality of sheet feeding ports and printing; and a sheet attribute discriminating unit that discriminates whether only one of a plurality of sheet feeding ports in which the sheets of a same size and/or a same type as a sheet size and/or sheet type designated by the print request exists, or a plurality of sheet feeding ports in which the sheets of a same size and/or a same type as a sheet size and/or a sheet type designated by the print request exist.

9. A system according to claim 7, wherein when the discrimination result of the discriminating unit indicates that a number of appropriate sheet feeding ports is limited to one sheet feeding port, the correction amount deciding unit decides the correction amount based on an adjustment value received by the receiving unit corresponding to the one sheet feeding port.

10. A system according to claim 7, wherein when the discrimination result of the discriminating unit indicates that a plurality of appropriate sheet feeding ports exist, the correction amount deciding unit decides the correction amount based on a mean value of a plurality of adjustment values received by the receiving unit corresponding to the plurality of appropriate sheet feeding ports.

11. A system according to claim 7, wherein when the discrimination result of the discriminating unit indicates that a plurality of appropriate sheet feeding ports exist, the correction amount deciding unit decides the correction amount based on a predetermined value.

12. A system according to claim 11, wherein the predetermined value which is used when the discrimination result of the discriminating unit indicates that the plurality of appropriate sheet feeding ports exist is the same as in a state of no correction.

13. An image processing method carried out in an image processing apparatus for transmitting an image to be printed to an image forming apparatus, comprising:

a receiving step of receiving from the image forming apparatus an adjustment value of a print position for each sheet feeding port of a plurality of sheet feeding ports, the adjustment value corresponding to a deviation in a main scanning direction of a sheet feeding position;

a discriminating step of discriminating information of a sheet feeding port of a sheet which is used to print based on a print request, to determine at least one sheet feeding port for printing;

a correction amount deciding step of deciding a correction amount in the main scanning direction for a main scan positional deviation of the at least one sheet feeding port determined in the discriminating step based on a result of the discrimination and a corresponding adjustment value received in the receiving step; and a correction step of correcting a positional deviation in a sub-scanning direction of the image to be printed by using both (i) the correction amount decided in the correction amount deciding step and (ii) information showing the positional deviation in the sub-scanning direction of the image forming apparatus.

14. An image processing method comprising:

obtaining information of a main scan position in a main scanning direction which is determined based on a print position of each sheet feeding port of an image forming apparatus, the print position corresponding to a deviation in the main scanning direction of a sheet feeding position; and correcting a positional deviation in a sub-scanning direction of an image to be printed by using both (i) the obtained information of the main scan position determined based on the print position of each sheet feeding port and (ii) information showing the positional deviation in the sub-scanning direction of the image forming apparatus.

15. A non-transitory computer-readable storage medium which stores a program for allowing a computer to execute the image processing method according to claim 14.

* * * * *